Patented Feb. 9, 1932

1,844,012

UNITED STATES PATENT OFFICE

GEORG KALISCHER, OF FRANKFORT-ON-THE-MAIN, AND ERNST HONOLD, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

DYESTUFF OF THE ANTHRAQUINONE SERIES AND PROCESS OF MAKING SAME

No Drawing. Application filed January 29, 1929, Serial No. 336,001, and in Germany February 1, 1928.

Our present invention relates to new acid wool dyestuffs of the anthraquinone series and consists in condensing an 1-amino-4-halogeno-anthraquinone-2-sulfonic acid of the general formula:

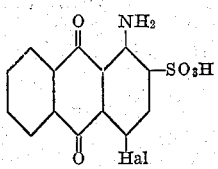

with a mercaptan of the general formula HSR, wherein R means an aryl or aralkyl group which may contain sulfonic groups and/or other substituents.

The dyestuffs correspond probably to the general formula

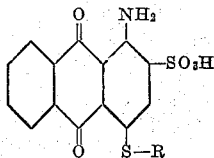

wherein R has the above signification.

The condensation is advantageously carried out in an aqueous or alcoholic solution. The mercaptans may be applied in the form of their alkali or heavy metal salts, e. g. of the zinc salts. An addition of a catalyst is scarcely necessary for our process as the reaction runs very smoothly and quickly. In order to obtain dyestuffs containing sulfonic groups attached to the aryl or aralkyl residue, the 1-amino-4-aryl- or -aralkyl-mercapto-anthraquinone-2-sulfonic acids may be subjected to a subsequent sulfonating process.

The dyestuffs obtained according to our process by starting from the special 1-amino-4-halogeno-anthraquinone-2-sulfonic acids are new, they are soluble in water, dye wool from an acid bath red to violet shades of an excellent fastness and possess a peculiarly good levelling property compared with the known wool dyestuffs of the anthraquinone series, containing a mercapto or thioether group in their molecule.

In order to further illustrate our invention the following examples are given, the parts being by weight and all temperatures in centigrade degrees; but we wish to be understood that our invention is not limited to the examples given, nor to the exact conditions stated therein.

Example 1

A solution of 40 parts of the sodium salt of 1-amino-4-bromo-anthraquinone-2-sulfonic acid and 19 parts of the sodium salt of 4-chloro-1-mercapto-benzene in 400 parts of water is boiled in an apparatus provided with a reflux condenser. The light red solution becomes dark red after a short time. When the reaction is finished the dyestuff is isolated by addition of common salt. It represents a dark red powder and corresponds probably to the formula:

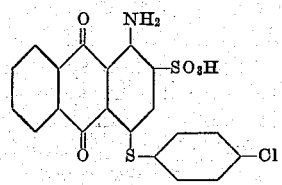

It dyes wool from an acid bath very fast strong bluish red shades and dissolves in sulfuric acid to a light orange-red solution turning to green when mixed with paraformaldehyde.

When 4-chloro-1-mercapto-benzene is replaced by 2.5-dichloro- or 2.3.4-trichloro-1-mercapto-benzene, dyestuffs of a very similar shade and nearly equal properties are obtained in like manner.

Example 2

1-amino-4-bromo-anthraquinone-2-sulfonic acid is condensed with 4-chloro-2.5-dimethyl-1-mercapto-benzene as described in Example 1. The dyestuff thus produced corresponds probably to the formula:

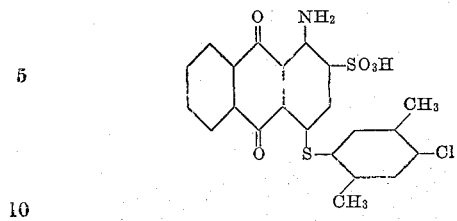

It dissolves in sulfuric acid to a brownish red solution and dyes wool fast reddish violet shades.

*Example 3*

1-amino-4-bromo-anthraquinone-2-sulfonic acid is condensed with 4-methyl-1-mercapto-benzene as described in Example 1. The dyestuff thus produced corresponds probably to the formula:

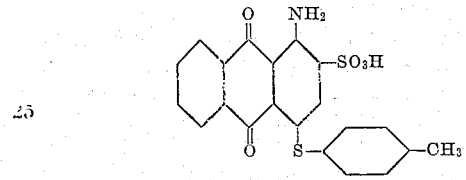

It dyes wool reddish violet shades of an excellent fastness and possesses an especially good levelling property.

The dyestuff may be sulfonated by being treated at 25° with five times its amount of sulfuric acid monohydrate. This product is easily soluble and dyes wool a shade not essentially different from that of the starting dyestuff.

*Example 4*

80 parts of the sodium salt of 1-amino-4-bromo-anthraquinone-2-sulfonic acid and 50 parts of the sodium salt of 9-mercapto-anthracene are dissolved in 1000 parts of water and the solution is boiled for a short time. The new dyestuff already separates partially from the hot solution in a crystalline form. The precipitation is completed by addition of common salt. The dyestuff thus isolated represents a red powder and corresponds probably to the formula:

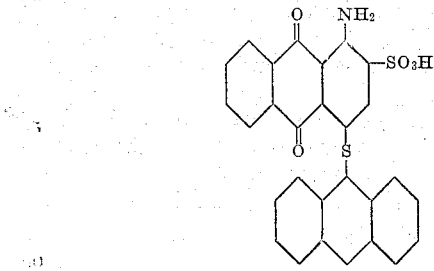

It dissolves in concentrated sulfuric acid to a yellowish orange solution and dyes wool from an acid bath dark reddish violet shades.

By treating this dyestuff at a moderate temperature with concentrated sulfuric acid, a higher sulfonated product is obtained which shows a similar shade and a higher solubility.

*Example 5*

A solution of 20 parts of the sodium salt of 1-amino-4-bromo-anthraquinone-2-sulfonic acid and 7 parts of sodium benzylmercaptide in 1000 parts of water is boiled for 20–30 minutes. The solution is filtered and mixed with common salt. The dyestuff thus isolated corresponds probably to the formula:

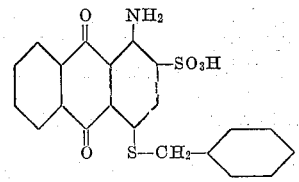

It dyes wool dark reddish violet shades and posseses a good fastness and levelling property.

*Example 6*

6.3 parts of the zinc salt of 1-mercapto-2-amino-5-ethoxy-benzene are introduced in the form of a paste into a solution of 10 parts of the sodium salt of 1-amino-4-bromo-anthraquinone-2-sulfonic acid in 500 parts of water. The mixture is stirred at 70° for some time, the reaction of the liquor being kept alkaline by adding a caustic soda solution. When the color of the mass has turned to reddish violet, indicating thus the end of the reaction, the dyestuff is precipitated by the addition of common salt. It corresponds probably to the formula:

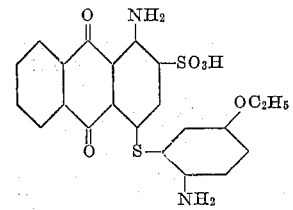

dissolves in concentrated sulfuric acid to an orange solution and dyes wool reddish brown shades.

When instead of 2-amino-5-ethoxy-benzene-1-mercaptide the corresponding amount of 2-amino-3-methyl-5-chloro-benzene-1-mercaptide is used, a dyestuff dyeing wool claret shades is produced.

We claim:

1. A process which comprises condensing an 1-amino-4-halogeno-anthraquinone-2-sulfonic acid of the general formula:

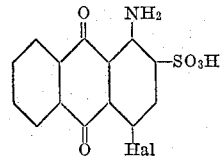

with a mercaptan of the general formula

HSR, wherein R means an aryl or aralkyl group.

2. A process which comprises condensing 1-amino-4-bromo-anthraquinone-2-sulfonic acid of the formula:

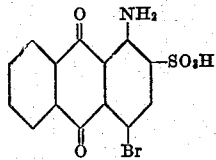

with 4-methyl-1-mercapto-benzene of the formula:

3. As new compounds wool dyestuff of the anthraquinone series corresponding probably to the general formula:

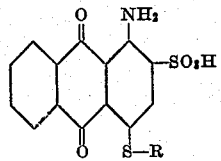

wherein R means an aryl or aralkyl group.

4. As a new compound a wool dyestuff of the anthraquinone series corresponding probably to the formula:

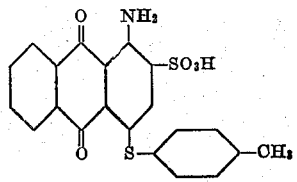

In testimony whereof, we affix our signatures.

GEORG KALISCHER.
ERNST HONOLD.